United States Patent
Lee (10) Patent No.: US 8,073,379 B2
(45) Date of Patent: Dec. 6, 2011

(54) RF SIGNAL OF KARAOKE DATA RECEIVING PACK AND KARAOKE SYSTEM USING THEREOF

(76) Inventor: Kyung-Ho Lee, Seoul (KR)

(*) Notice: Subject to any disclaimer, the term of this patent is extended or adjusted under 35 U.S.C. 154(b) by 1412 days.

(21) Appl. No.: 10/560,143

(22) PCT Filed: Jun. 10, 2004

(86) PCT No.: PCT/KR2004/001377
§ 371 (c)(1),
(2), (4) Date: Sep. 25, 2006

(87) PCT Pub. No.: WO2004/109701
PCT Pub. Date: Dec. 16, 2004

(65) Prior Publication Data
US 2007/0048711 A1 Mar. 1, 2007

(30) Foreign Application Priority Data
Jun. 10, 2003 (KR) .................. 10-2003-0037187

(51) Int. Cl.
*G09B 5/00* (2006.01)
(52) U.S. Cl. .................................... 434/307 A
(58) Field of Classification Search .......... 434/307 A, 434/323; 381/26; 181/158
See application file for complete search history.

(56) References Cited

U.S. PATENT DOCUMENTS

| | | | | |
|---|---|---|---|---|
| 5,808,224 A | * | 9/1998 | Kato | 84/609 |
| 5,906,494 A | * | 5/1999 | Ogawa et al. | 434/307 A |
| 6,267,600 B1 | * | 7/2001 | Song | 434/307 A |
| 6,520,776 B1 | * | 2/2003 | Furukawa | 434/307 A |
| 7,328,272 B2 | * | 2/2008 | Kuramochi et al. | 709/231 |

FOREIGN PATENT DOCUMENTS

| | | |
|---|---|---|
| JP | 8-137485 | 5/1996 |
| JP | 10-187171 | 7/1998 |
| KR | 96-35608 | 10/1996 |
| KR | 2000-30411 | 6/2000 |
| KR | 2004-33191 | 4/2004 |

* cited by examiner

*Primary Examiner* — Xuan Thai
*Assistant Examiner* — Banafsheh Hadizonooz
(74) *Attorney, Agent, or Firm* — The Farrell Law Firm, P.C.

(57) ABSTRACT

Disclosed are an RF signal of karaoke data receiving pack and karaoke system using thereof. The RF Karaoke data receiving pack includes an RF receiver for receiving a voice signal and key data signal radio-transmitted from a wireless microphone device via a receiving antenna; an audio/key data signal separator for separating the voice signal and key data signal from the signal demodulated by the demodulator, a receiver MCU controlling the internal operation of the RF karaoke data signal receiving pack while transmitting the digital voice signal and key data signal to the external computing device; and an extension pack in which additional songs are recorded, the extension pack being connected to an extension pack slot to transmit data of the additional songs under the control of the receiver MCU.

8 Claims, 6 Drawing Sheets

RF SIGNAL OF KARAOKE DATA RECEIVING PACK AND KARAOKE SYSTEM USING THEREOF

BACKGROUND OF THE INVENTION

1. Field of the Invention

The present invention relates to a Radio-Frequency (RF) signal of karaoke data receiving pack and karaoke system using thereof. More specifically, the invention relates to an RF signal of karaoke data receiving pack and karaoke system using thereof, in which an extension pack is combined with an extension pack slot such that songs are easily added and a main body has a computing function and a wired or a wireless serial communication function and is easily connected to an external computing device so that a user can enjoy Karaoke using the computing function of the external computing device.

2. Description of the Related Art

A Karaoke system known as a popular entertainment apparatus has been developed into a potable Karaoke device constructed in such a manner that a microphone and the main body of the system are integrated into each other owing to a demand for space saving and a development of semiconductor integrated circuit technology. The portable Karaoke device has an outer appearance similar to a microphone and includes a microphone grill placed on the top of the main body and various circuit components arranged inside the main body. In addition, numeral keys required for selecting a song number are located on the front face of the main body, and a Liquid Crystal Display (LCD) for displaying a selected song number is disposed above the numeral keys. A video signal output from the portable Karaoke device is provided to a video input port of an Audio-Video (AV) system such as a TeleVision (TV) receiver through a cable and an audio signal output from the portable Karaoke device is transmitted to an audio input port of the TV receiver through a wire to be reproduced.

However, the conventional portable Karaoke device is large, heavy and expensive because all of the components are mounted in the main body.

In the meantime, a variety of electronic game devices, which can be easily connected to a TV receiver having a screen larger than that of a computer monitor and audio processing performance superior to that of a computer such that users can enjoy games, are put on the market. PLAYSTATION® of Sony Co. and XBOX® of Microsoft are typical game devices. Furthermore, a high-performance Central Processing Unit (CPU), a large-capacity memory and various peripherals as powerful as those of a personal computer are mounted in the game devices because a CPU processing speed and memory capacity are remarkably increased. However, these game devices are used only for games, but not used for other purposes in spite of their high performances.

Moreover, a game program is installed in a personal computer such that a desired game or a desired song can be downloaded to enjoy. However, the lyric of a selected song cannot be displayed using the personal computer.

SUMMARY OF THE INVENTION

Accordingly, the present invention has been made in view of the above problems occurring in the prior art, and it is an object of the present invention is to provide a Radio-Frequency (RF) signal of karaoke data receiving pack and karaoke system using thereof, in which an extension pack is combined with an extension pack slot such that songs are easily added and a main body has a computing function and a wired or a wireless serial communication function and is easily connected to an external computing device so that a user can enjoy Karaoke using the computing function of the external computing device.

To accomplish the above object, according to one aspect of the present invention, there is provided an RF Karaoke data receiving pack comprising an RF receiver for receiving a voice signal and key data signal radio-transmitted from a wireless microphone device via a receiving antenna; a demodulator for demodulating the signal applied thereto from the RF receiver; an audio/key data signal separator for separating the voice signal and key data signal from the signal demodulated by the demodulator; a waveform shaping unit for shaving the waveform of the key data signal; an Analog-to-Digital (A/D) converter for converting the voice signal into a digital signal; a receiver Micro Controller Unit (MCU) connected to an external computing device having a computing function and a sound processing function, the receiver MCU controlling the internal operation of the RF Karaoke data signal receiving pack while transmitting the digital voice signal and key data signal to the external computing device; a serial communication interface transmitting the digital voice signal and key data signal to the external computing device under the control of the receiver MCU; and an extension pack in which additional songs are recorded, the extension pack being connected to an extension pack slot to transmit data of the additional songs under the control of the receiver MCU.

The serial communication interface may be a Universal Serial Bus (USB) interface and the external computing device may be an XBOX® game device or the main body of a personal computer.

To accomplish the above object, according to another aspect of the present invention, there is also provided a Karaoke system comprising a wireless microphone device for modulating key data signal generated from various keys including numeral keys used for selecting a song and accompaniment keys and a user's voice signal and radio-transmitting the modulated key data signal and voice signal; an external computing device including a computing function, a serial communication interface and a sound processing function, the external computing device being the subject of the operation of the Karaoke system; an RF Karaoke system data receiving pack for receiving the voice signal and key data signal from the wireless microphone device, demodulating the received voice signal and key data signal and transmitting the demodulated voice signal and key data signal to the external computing device via the serial communication interface; an optical disk storing a Karaoke system operating program executed and read by the external computing device, song data and background image data; and an audio device connected to the external computing device through a connector to reproduce an audio signal provided by the external computing device.

BRIEF DESCRIPTION OF THE DRAWINGS

Further objects and advantages of the invention can be more fully understood from the following detailed description taken in conjunction with the accompanying drawings, in which.

DETAILED DESCRIPTION OF EMBODIMENTS OF THE INVENTION

The present invention will now be described in detail in connection with preferred embodiments with reference to the accompanying drawings.

Figure 1:
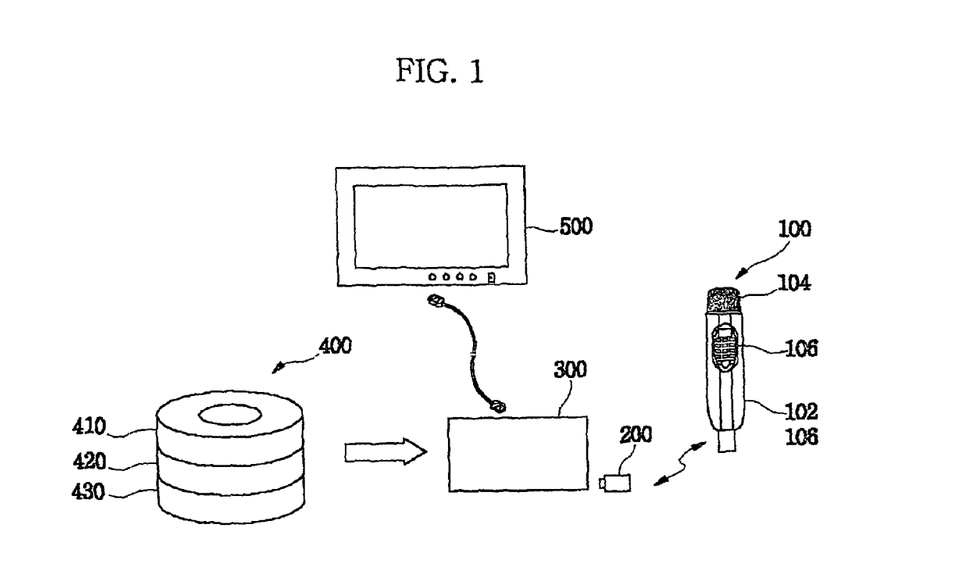
FIG. 1 illustrates the construction of a Karaoke system according to an embodiment of the present invention.

FIG. 1 illustrates the construction of a Karaoke system according to an embodiment of the present invention. In the construction of the Karaoke system according to the present invention, a serial communication driver is used as an RF Karaoke data signal receiving pack and an XBOX® game device is used as an external computing device, for example.

The Karaoke system according to the embodiment of the present invention includes a wireless microphone device 100, a serial communication driver as an RF Karaoke data receiving pack 200, an XBOX® game device as an external computing device that is the subject of the operation of the Karaoke system, a Digital Versatile Disc (DVD) Read Only Memory (ROM) 400, and a TV receiver 500. The wireless microphone device 100 modulates key data signal generated from various keys including numeral keys used for selecting a song and accompaniment keys and a user's voice signal and radio-transmits the modulated data and signal. The serial communication driver as an RF Karaoke data receiving pack 200 is connected to a serial communication port of the XBOX® game device 300, for example, a joystick input port. The RF Karaoke data receiving pack 200 receives and demodulates the key data signal and voice signal transmitted from the wireless microphone device 100 and transmits the demodulated data and signal to the external computing device 300. The DVD-ROM 400 includes a Karaoke system operating program 410 executed and read by the XBOX® game device 300, a song data storage unit 420 and a background image data storage unit 430. The TV receiver 500 is connected to the XBOX® game device 300 via an AV connector and audio-visually reproduces video and audio signals transmitted from the XBOX® game device 300.

The wireless microphone device 100 includes a main body 102 a user can grip, a microphone grill 104 provided on the top of the main body 102, and a key pad 106 placed at the middle part of the main body 102.

The XBOX® game device 300, which is a next-generation video game device of Microsoft Co. includes Intel pentium III 733 MHz CPU, a large-capacity hard disk drive having capacity of more than 8 GB, a 64 MB main memory, a high-performance graphic processor (graphic card), four controller ports (joystick input ports), a single AV output port, a single Ethernet port, 5.times. DVD-ROM drive, 256 audio channels, 64 3D audio channels, and an audio digital-analog converter. The XBOX® game device 300 is supported by Musical Instrumental Digital Interface (MIDI).

The serial communication driver 200 transmits and receives signals in a wireless or wired manner using one of a USB (universal serial bus) drive, an FM transceiver, a laser transceiver and an infrared transceiver.

Figure 2:
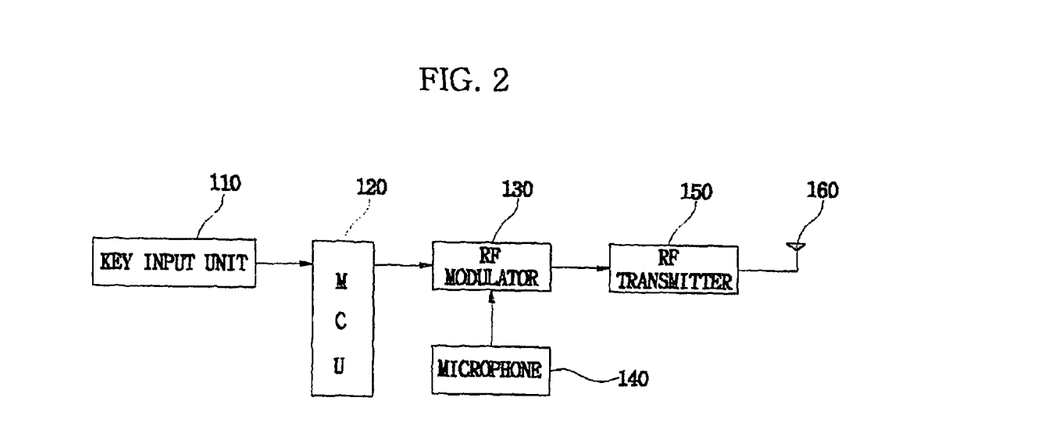
FIG. 2 is a block diagram of the wireless microphone device of the Karaoke system shown in FIG. 1.

FIG. 2 is a block diagram of the wireless microphone device of the Karaoke system shown in FIG. 1. Referring to FIG. 2, the wireless microphone 100 includes a key input unit 110, a microphone 140, a micro-controller unit 120, an RF modulator 130, and an RF transmitter 150. The key input unit 110 receives commands input by a user through the numeral keys used for selecting a song, the accompaniment key and other function keys. The microphone 140 converts the user's voice into an electric audio signal. The micro-controller unit 120 identifies the commands input to the key input unit 110 and outputs a key data signal corresponding to each command. Hereinafter, the micro-controller unit 120 is called MCU and, when there is a need to distinguish the MCU 120 from an MCU included in the serial communication driver, which will be explained later, the former is called "transmitter MCU" and the latter is called "receiver MCU".

The RF modulator 130 modulates the audio signal transmitted from the microphone 140 and the key data signal sent from the transmitter MCU 120 into predetermined RF frequency signals. The RF transmitter 150 transmits the key data signal and audio signal modulated by the RF modulator 130 via a transmission antenna 160. The wireless microphone device can further include an LCD panel used for the user to confirm a selected song number under the control of the transmitter MCU 120.

Figure 3:
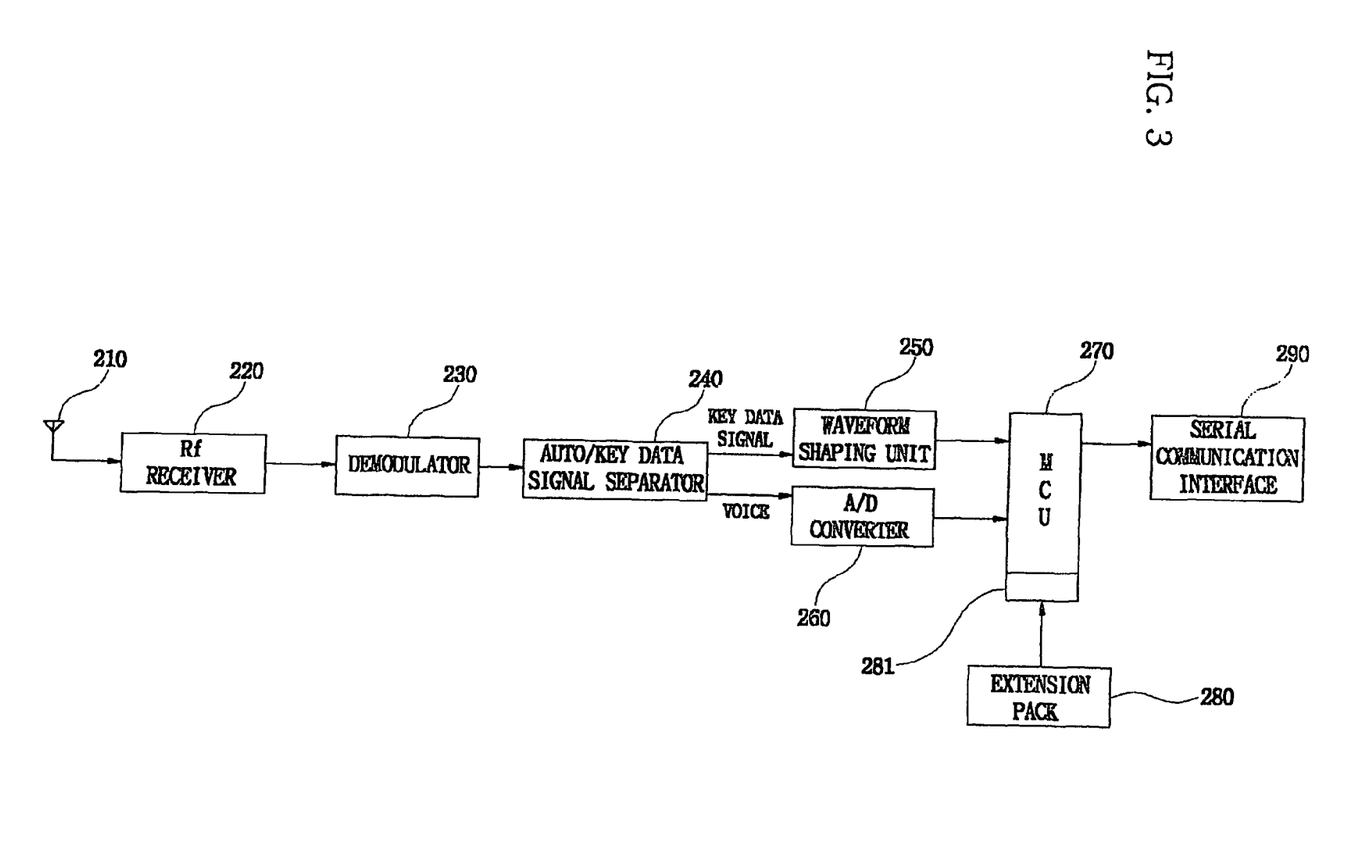
FIG. 3 is a block diagram of the serial communication driver used as the RF Karaoke data receiving pack of the Karaoke system of FIG. 1.

FIG. 3 is a block diagram of the serial communication driver used as the RF Karaoke data receiving pack of the Karaoke system of FIG. 1. Referring to FIG. 3, the serial communication driver includes an RF receiver 220, a demodulator 230, an audio/key data signal separator 240, a waveform shaping unit 250, an A/D converter 260, a micro-controller unit (receiver MCU) 270, a serial communication interface 280, and an extension pack 280.

The RF receiver 220 receives a signal radio-transmitted from the wireless microphone device 100 via a receiving antenna 210. The demodulator 230 demodulates the signal applied thereto from by the RF receiver 220. The audio/key data signal separator 240 separates an audio signal and key data signal from the signal demodulated by the demodulator 230. The waveform shaping unit 250 shapes the waveform of the key data signal. The A/D converter 260 converts the analog audio signal into digital signal. The receiver MCU unit 270 is connected to the external computing device (XBOX® game device in this embodiment) having a computing function, a serial communication interface and a sound processing function to control the internal operation of the serial communication driver while transmitting the digital audio signal and key data signal to the external computing device. The serial communication interface 290 transmits the digital audio signal and key data signal to the external computing device under the control of the receiver MCU 170. The extension pack 280 for storing additional songs is combined with an extension pack slot 281 to transmit data of the additional songs under the control of the receiver MCU 270. Newly added song data is stored in the extension pack 280 such that the user can easily enjoy newly added songs at a low cost.

Figure 4:
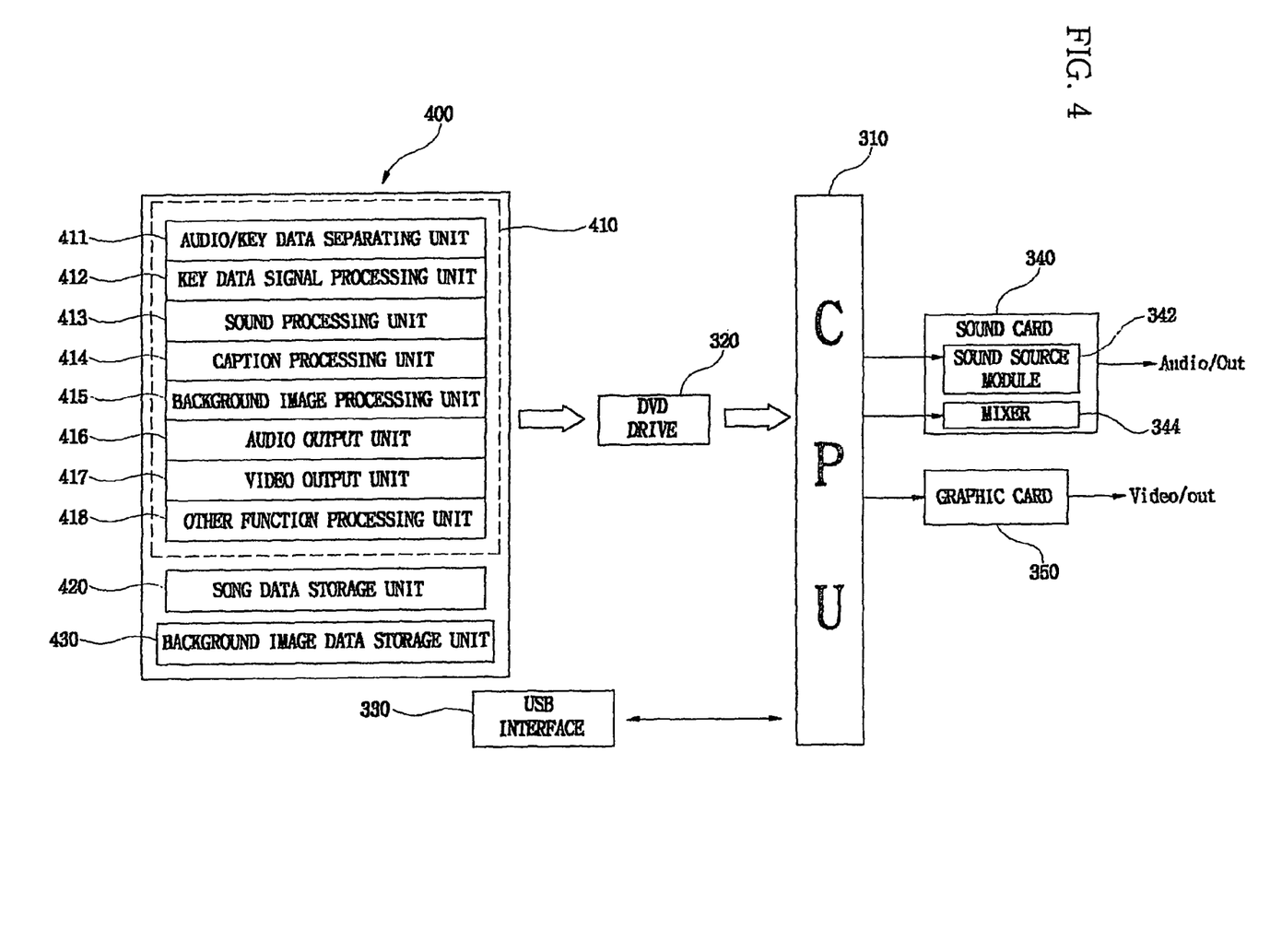
FIG. 4 is a block diagram of the XBOX® game device of the Karaoke system of FIG. 1.

FIG. 4 is a block diagram of the XBOX® game device of the Karaoke system of FIG. 1. Referring to FIG. 4, the XBOX® game device includes a CPU 310 for controlling components of the game device according to an operating system installed therein, a DVD-ROM driver 320 for reading information stored in the DVD-ROM 400 under the control of the CPU 310, a sound source module 342 for supporting an internal MIDI interface, a sound card 340 having a mixer 344 for mixing a wave MIDI with sounds input through various channels, a graphic card 350 for processing images related with games, four controller ports and a hard disk (not shown) constructing a USB interface 330.

The DVD-ROM 400 includes the Karaoke system operating program 410, song data storage unit 420 for storing song data and background image data storage unit 430 for storing video data constructing background images. The song data storage unit 420 stores MIDI data that is melody data and lyric data synchronized with the MIDI data.

The Karaoke system operating program 410 includes an audio/key data separating unit 411, a key data processing unit 412, a sound processing unit 413, a caption processing unit 414, a background image processing unit 415, an audio output unit 416, a video output unit 417 and an other function processing unit 418. The audio/key data separating unit 411 separates a digital audio signal and key data signal input through the USB interface 330 from each other. The key data processing unit 412 identifies the contents and kind of the separated key data. The sound processing unit 413 reads song data of a corresponding song, stored in the song data storage unit 420, separates MIDI data from the song data to provide the MIDI data to the sound source module 342 and provides the digital audio signal separated by the audio/key data separating unit 411 to the mixer 344. The caption processing unit 414 reads the song data and separates lyric data from the song data. The background image processing unit 415 reads background image data stored in the background image data storage unit 430 and superimposes the lyric separated by the caption processing unit 414 on the background image corresponding to the background image data. The audio output unit 416 outputs an audio signal, that is, a mixed signal of a voice signal and a melody processed by the sound source module 342 to an audio port of the TV receiver. The video output unit 417 outputs the background image and lyric processed by the background image processing unit 415 to a video port of the TV receiver. The other function processing unit 418 processes many functions including a recording function and a function of generating various sound effects such as echo and chorus.

Preferably, the Karaoke system operating program included in the DVD-ROM 400 is automatically installed in a hard disk when executed by the XBOX® game device 300. In addition, song data and background image data can be transferred to the hard disk.

Figure 5:
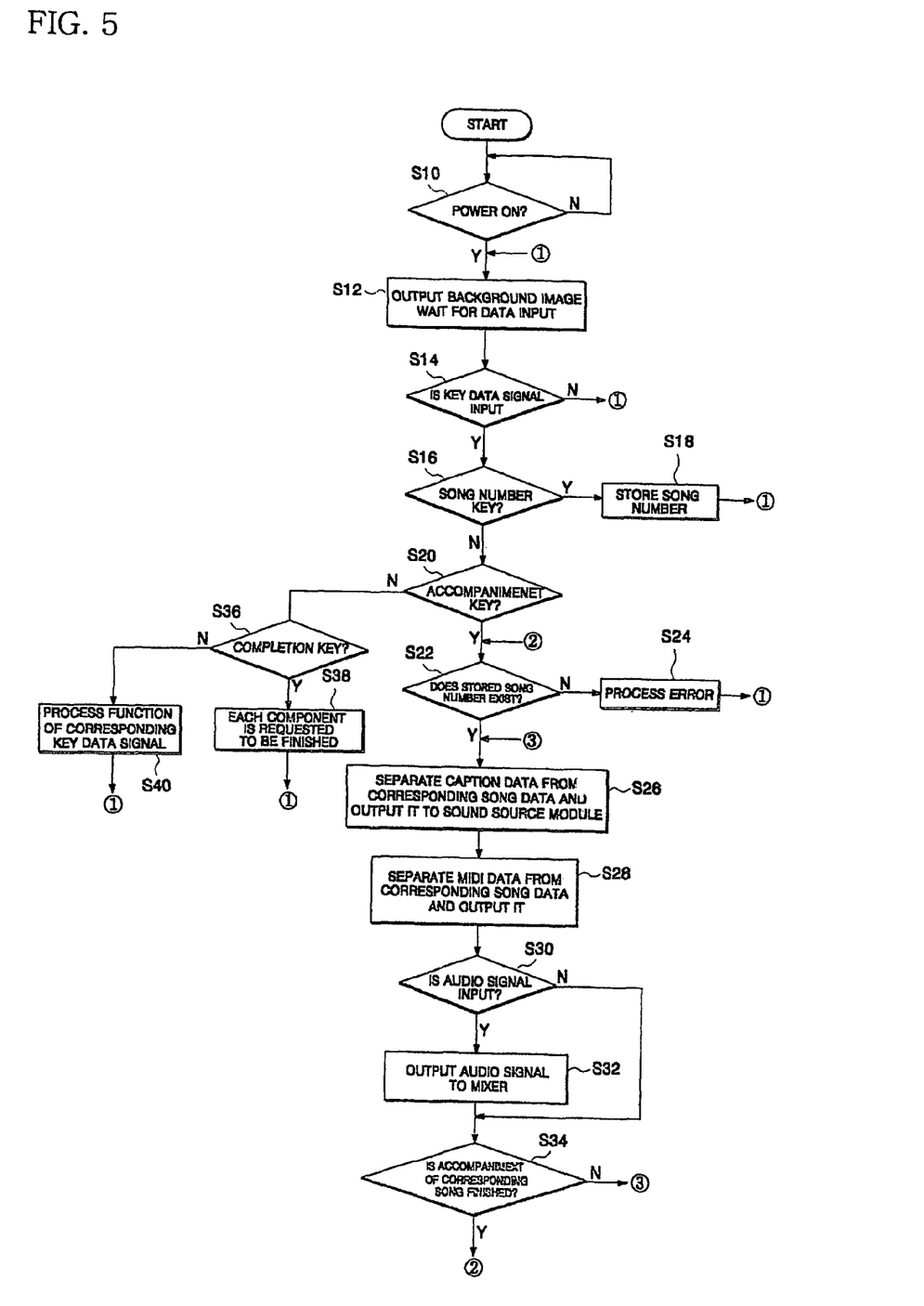
FIG. 5 is a flow chart showing the operation of the Karaoke system of the present invention.

FIG. 5 is a flow chart showing the operation of the Karaoke system of the present invention. Here, the CPU 310 of the XBOX® game device 300 executes the operation of the Karaoke system in cooperation with the Karaoke system operating program 410 included in the DVD-ROM.

Referring to FIG. 5, the serial communication driver 200 is connected to a controller port of the XBOX® game device 300 and the XBOX® game device 300 is powered on in the step S10. When the DVD-ROM 400 is loaded into a DVD tray (not shown), the CPU 310 outputs video data corresponding to a background image to the TV receiver 500 and waits for input of key data signal in the step S12. Then, the CPU 310 judges whether key data signal is input in the step S14. When the key data signal is input, the CPU 310 judges whether the input key data signal is key data signal about a song number in the step S16. When the input key data is the key data about a song number, the CPU 310 stores the song number in the step S18 and the routine is returned to the step S12. When the input key data is not the key data about a song number, the CPU 310 judges whether the input key data is accompaniment key data in the step S20.

When the input key data is the accompaniment key data, the CPU judges whether there is a stored song number in the step S22. When there is the stored song number, the CPU separates MIDI data from corresponding song data and outputs the MIDI data to the sound source module 342 in the step S26 and separates caption data from the song data and outputs the caption data in the step S28. When there is no stored song number, the CPU process an error in the step 24 and the routing returns to the step S12.

The CPU judges whether a voice signal is input in the step S30. When the voice signal is input, the CPU outputs the voice signal to the mixer 344 in the step S32. The mixer 344 mixes the voice signal with a melody provided by the sound source module 342 and outputs the mixed signal to the TV receiver 500 through the audio port.

Then, the CPU judges whether the accompaniment of the corresponding song is finished in the step S34. The routine is returned to the step S26 when the accompaniment is not finished yet but returns to the step S22 when the accompaniment is finished.

When the input key data is not the accompaniment key data in the step S20, the CPU judges whether a completion key is input in the step S36. The CPU processes the function of the key data in the step S40 when the completion key is not input, and components of the XBOX® game device 300 are requested to be finished in the S38 when the completion key is input.

Figure 6A:
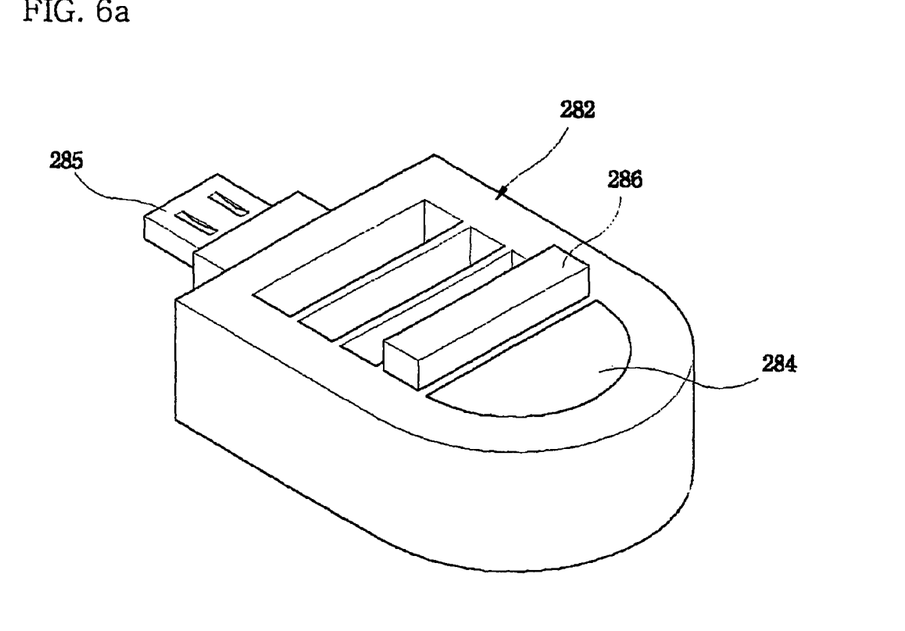
FIG. 6a is a perspective view of an extension pack according to an embodiment of the present invention.
Figure 6B:
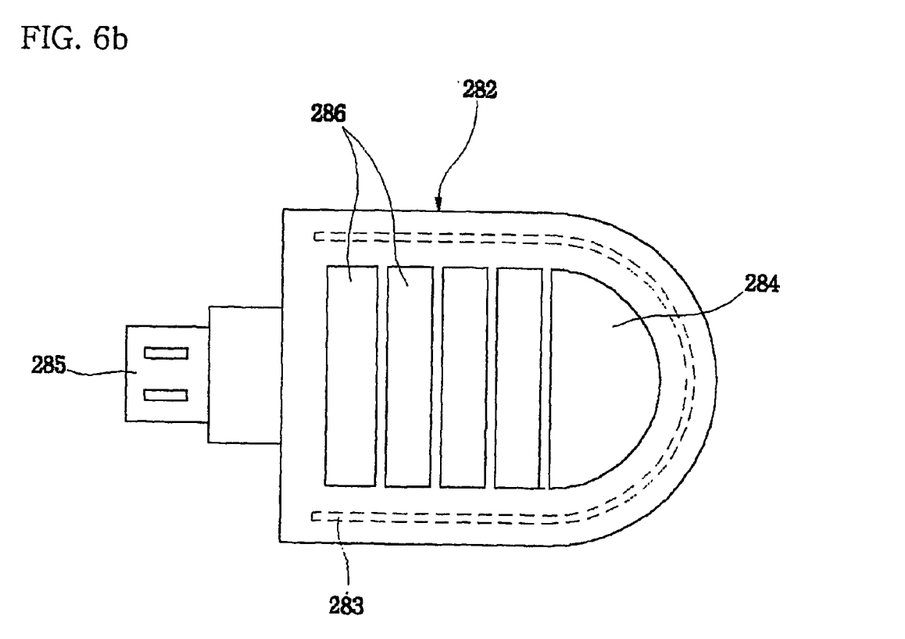
FIG. 6b is a plane view of the extension pack according to an embodiment of the present invention.

FIGS. 6a and 6b illustrate the extension pack according to an embodiment of the present invention. FIG. 6a is a perspective view of the extension pack and FIG. 6b is a plane view of the extension pack.

The extension pack includes a housing 282 forming the body of the extension pack, an antenna wire 283, an RF signal receiving pack 284, a male connector 285 for a receiving module, and a plurality of storage packs 286. The antenna wire 283 is fixed inside the housing along the edge of the housing and captures an RF signal to transmit the RF signal. The RF signal receiving pack 284 demodulates the RF signal transmitted from the wireless microphone and captured by the antenna wire 283 and separates a song data signal from the RF signal. The male connector 285 is electrically connected to an output signal line of the RF signal receiving pack 284 and protruded from one side of the housing 282 such that the male connector is connected to the extension slot 281 under the control of the receiver MCU 270. The plurality of storage packs 286 are fitted in the housing 282 and store data about new songs.

While the antenna wire 283 can be formed in a 'U' shape, the shape of the antenna wire is not limited thereto. The antenna wire 283 can be formed at a proper position inside the housing 282 in a predetermined length.

Figure 7:
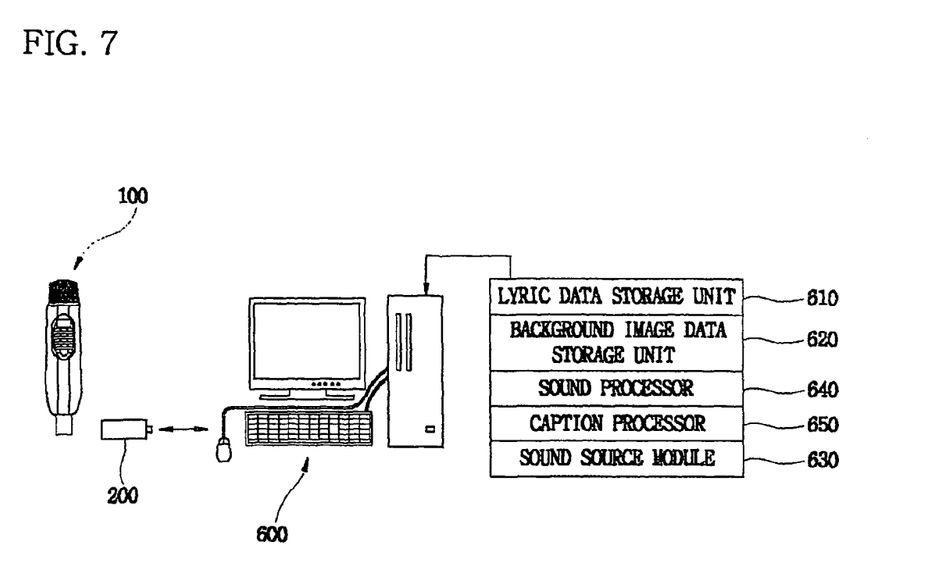
FIG. 7 illustrates a Karaoke system using a personal computer instead of the XBOX® game device according to another embodiment of the present invention.

FIG. 7 illustrates a Karaoke system using a personal computer instead of the XBOX® game device according to another embodiment of the present invention. Referring to FIG. 7, the Karaoke system includes a wireless microphone device 100, a serial communication driver 200, and a personal computer 600. The wireless microphone device 100 modulates key data signal generated from various keys including numeral keys used for selecting a song and accompaniment keys and a 'user's voice signal and radio-transmits the modulated data and signal. The serial communication driver 200 is connected to a serial communication port of the personal computer 600, receives the key data signal and voice signal from the wireless microphone device 100, demodulates the key data signal and voice signal and transmits the demodulated signals to the personal computer 600.

The personal computer 600 is the subject of the operation of the Karaoke system. The personal computer 600 includes a lyric data storage unit 610 in which a Karaoke system operating program is installed, a background image data storage unit 620, a sound source module 630, a sound processor 640, and a caption processor 650. The lyric data storage unit 610 stores lyric data, and the background image data storage unit 620 stores video data corresponding to backgrounds. The sound processor 640 reads song data about a song stored in the lyric data storage unit 610 and separates MIDI data from the song data to provide the MIDI data to the sound source module 630. The caption processor 650 reads lyric data about a corresponding song from the lyric data storage unit 610 and separates caption data from the lyric data.

For example, a computer including a sound card, a USB port and a speaker can be used as the external computing device. Furthermore, game devices having functions similar to that of the XBOX® game device can be used as the external computing device. When the computer is used as the external computing device, a compact disk can replace the DVD. Moreover, Institute of Electrical and Electronics Engineers (IEEE) 1394 device, which has a serial communication interface with high operating speed and does not require a host controller, can replace the serial communication driver.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

According to the present invention, only the wireless microphone device, RF Karaoke data receiving pack and DVD are needed to construct an inexpensive Karaoke system because an external computing device a user owns can be used. Thus, the external computing device of the user can be utilized for various purposes. Furthermore, the present invention can provide a compact portable Karaoke system such that the user can easily carry the Karaoke system when moved.

What is claimed is:

1. A Radio-Frequency (RF) Karaoke data receiving pack comprising:
    an RF receiver for receiving a voice signal and key data signal radio-transmitted from a wireless microphone device via a receiving antenna;
    a demodulator for demodulating the received voice signal and the received data signal from the RF receiver;
    an audio/key data separator for separating the voice signal and key data signal from the signal demodulated by the demodulator;
    a waveform shaping unit for shaping the waveform of the key data signal;
    an Analog-to-Digital (A/D) converter for converting the voice signal into a digital signal;
    a receiver Micro-Controller Unit (MCU) connected to an external computing device having a computing function and a sound processing function, the receiver MCU controlling an internal operation of the RF Karaoke data signal receiving pack while transmitting the digital voice signal and key data signal to the external computing device;
    a serial communication interface transmitting the digital voice signal and key data signal to the external computing device under a control of the receiver MCU; and
    an extension pack in which additional songs are recorded, the extension pack being connected to an extension pack slot to transmit data of the additional songs under the control of the receiver MCU.

2. The RF Karaoke data receiving pack as claimed in claim 1, wherein the serial communication interface transmits or receives signals in a wired or wireless manner using one of a Universal Serial Bus (USB) drive, an RF transceiver, a laser transceiver and an infrared transceiver.

3. The RF Karaoke data receiving pack as claimed in claim 1, wherein the external computing device comprises an XBOX® game device.

4. The RF Karaoke data receiving pack as claimed in claim 1, wherein the external computing device comprises a main body of a personal computer.

5. The RF Karaoke data receiving pack as claimed in claim 1, wherein the extension pack comprises:
    a housing forming the body of the extension pack;
    an antenna wire fixed inside the housing along the edge of the housing, the antenna wire capturing an RF signal and transmitting the captured RF signal;
    an RF signal receiving pack for demodulating the RF signal transmitted from the wireless microphone device and captured by the antenna wire and separating a song data signal from the RF signal;
    a male connector for a receiving module, the male connector being electrically connected to an output signal line of the RF signal receiving pack and protruded from one side of the housing such that the male connector is connected to the extension slot under the control of the receiver MCU; and
    a plurality of storage packs fitted in the housing, for storing data of new songs and outputting the data.

6. A Karaoke system comprising:
    a wireless microphone device for modulating a key data signal generated from various keys including numeral keys used for selecting a song and accompaniment keys and a user's voice signal and radio-transmitting the modulated key data signal and a voice signal;
    an external computing device including a computing function, a serial communication interface and a sound processing function, the external computing device being a subject of an operation of the Karaoke system;
    a Radio-Frequency (RF) Karaoke system data receiving pack for receiving the voice signal and key data signal from the wireless microphone device, demodulating the received voice signal and key data signal, waveform shaping the demodulated key data signal, and transmitting the demodulated voice signal and the waveform-shaped key data signal to the external computing device via the serial communication interface;
    an optical disk for storing a Karaoke system operating program executed and read by the external computing device, song data and background image data; and
    an audio device connected to the external computing device through a connector for reproducing an audio signal provided by the external computing device.

7. The Karaoke system as claimed in claim 6, wherein the serial communication interface comprises a Universal Serial Bus (USB) interface.

8. The Karaoke system as claimed in claim 6, wherein the optical disk comprises a Digital Versatile Disc (DVD)-Read Only Memory (ROM).

* * * * *